US009547570B2

(12) United States Patent
Chu et al.

(10) Patent No.: US 9,547,570 B2
(45) Date of Patent: Jan. 17, 2017

(54) DEVICES, SYSTEMS AND METHODS FOR DEBUGGING NETWORK CONNECTIVITY

(71) Applicants: Xingjun Chu, Ottawa (CA); Yinfeng Henry Yu, Ottawa (CA); Guoli Yin, Ottawa (CA); Yapeng Wu, Nepean (CA); Tao Wan, Ottawa (CA); Peter Ashwood-Smith, Gatineau (CA); Khaldoon Al-Zoubi, Kanata (CA)

(72) Inventors: Xingjun Chu, Ottawa (CA); Yinfeng Henry Yu, Ottawa (CA); Guoli Yin, Ottawa (CA); Yapeng Wu, Nepean (CA); Tao Wan, Ottawa (CA); Peter Ashwood-Smith, Gatineau (CA); Khaldoon Al-Zoubi, Kanata (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 106 days.

(21) Appl. No.: 14/608,653

(22) Filed: Jan. 29, 2015

(65) Prior Publication Data

US 2016/0226744 A1     Aug. 4, 2016

(51) Int. Cl.
*G06F 11/263* (2006.01)
*H04L 12/24* (2006.01)
*H04L 12/26* (2006.01)

(52) U.S. Cl.
CPC ......... *G06F 11/263* (2013.01); *H04L 41/0866* (2013.01); *H04L 41/0869* (2013.01);
(Continued)

(58) Field of Classification Search
CPC ............. H04L 41/0866; H04L 41/0869; H04L 41/0873; H04L 41/12; H04L 41/10; H04L 43/106; H04L 43/12

See application file for complete search history.

(56) References Cited

U.S. PATENT DOCUMENTS 7,940,695 B1    5/2011    Bahadur et al.
8,902,780 B1    12/2014   Hegde et al.
(Continued)

FOREIGN PATENT DOCUMENTS

WO    2014080276 A1    5/2014

OTHER PUBLICATIONS

Author Unknown, The Traceroute command in MPLS, Cisco Publication, as archived by www.archive.org on Feb. 24, 2014, pp. 1-8.*
(Continued)

*Primary Examiner* — Christopher Crutchfield
(74) *Attorney, Agent, or Firm* — Norton Rose Fulbright Canada LLP; Maya Medeiros (57) ABSTRACT

The devices, systems, and methods test network connectivity, where the physical network is used to provide one or more service chains connecting service appliances, including firewalls, intrusion detection systems, load balancers, network address translators, web servers, and so on. A service chain may involve multiple routing paths. The devices, systems, and methods test network connectivity test network connectivity by injecting customized echo request packets on each routing path and collecting customized echo reply packets in response. The customized echo reply packets are processed and aggregated to isolate network connectivity problems.

21 Claims, 10 Drawing Sheets

(52) U.S. Cl.
CPC ........ *H04L 41/142* (2013.01); *H04L 41/5012* (2013.01); *H04L 43/106* (2013.01)

(56) References Cited

U.S. PATENT DOCUMENTS

| | | | |
|---|---|---|---|
| 2003/0162495 A1* | 8/2003 | Yonemoto | H04L 12/18 455/7 |
| 2009/0037713 A1* | 2/2009 | Khalid | H04L 12/4633 713/1 |
| 2014/0160977 A1 | 6/2014 | Serbest et al. | |
| 2015/0063102 A1* | 3/2015 | Mestery | H04L 41/12 370/230 |
| 2015/0089082 A1* | 3/2015 | Patwardhan | H04L 45/44 709/243 |
| 2015/0092564 A1* | 4/2015 | Aldrin | H04L 41/5038 370/241.1 |

OTHER PUBLICATIONS

L Prat, MPLS Layer 3 VPNs Troubleshooting, Feb. 25, 2013, pp. 1-20.*

Y. Jiang, W. Xu, Z. Cao, Fault Management in Service Function Chaining, IETF internet draft draft-jxc-sfc-fm-01, pp. 1-13, Oct. 27, 2014.*

P. Quinn, P. Agarwal, R. Manur, R. Fernando, J. Guichard, S. Kumar, A. Chauhan, M. Smith N. Yadav, B. McConnel, Network Service Header, IETF internet draft draft-quinn-sfc-nsh-00, pp. 1-21, Oct. 7, 2013.*

* cited by examiner

DEVICES, SYSTEMS AND METHODS FOR DEBUGGING NETWORK CONNECTIVITY

FIELD

Embodiments described herein relate to generally to the field of network connectivity, and in particular, embodiments described herein relate to devices, systems and methods for debugging network connectivity.

BACKGROUND

A data center network may implement a service chain to define network traffic regulation using service chain appliances as a series of check points and policy enforcement points. There exists a need for improved connectivity debugging tools for networks implementing service chains, or at least alternatives.

SUMMARY

In accordance with one aspect, there is provided a method for testing or debugging service chain connectivity on a network. A network incorporates interconnected nodes for transmitting, forwarding and/or receiving information which is generally segmented into data packets. The network may connect service appliances. The method may involve mapping a service chain of service appliances to one or more routing paths configured on the physical network. A routing path may include an access router having an ingress port. The mapping may be generated by a controller. The method may further involve injecting customized echo test packets at the ingress port of each access router. Each routing path may be a logical path which carries all traffic flows from one group of end points on the network to another group of end points on the network. An association between the initial test packet and the service chain may be identified by the access interface or port used for packet injection. A routing path may include multiple physical network paths between each pair of end points. Each physical path may comprise an access router with an ingress interface which may be physical port or a virtual local area network (VLAN) interface. A customized echo test packet may include a test request payload. The method may further involve receiving, at the controller, customized echo reply timestamp packets. A customized echo reply packet may include a reply payload. The reply payload may include a service chain identifier and router configuration data. The service chain identifier may uniquely identify the service chain being tested. The method may further involve aggregating, by the controller, the customized echo reply packets to test connectivity of the service chain. The controller may aggregate the customized echo reply packets using the service chain identifier and the router configuration data from each of the customized echo reply packets.

The method may involve, in some example embodiments, identifying a routing path of the one or more routing paths when an associated reply packet is not received.

In some example embodiments, the customized echo test packets may include a timestamp.

In some example embodiments, the test request payload may be of a predefined data format. This may assist a router receiving the customized echo request packet to recognize the customized echo request packet as including a request for routing configuration data.

In some example embodiments, the test request payload of the customized echo request packet may include a version number for the predefined data format.

In some example embodiments, the customized echo test packets may include a source identifier referring to an end point of each routing path.

In some example embodiments, the service chain identifier may include at least three physical attributes of the service chain. For example, three physical attributes may include physical interface, route distinguisher number, and virtual network address.

In some example embodiments, the test request payload of the customized echo request packet may include a type of request value which indicates the type of router configuration data requested in reply.

In some example embodiments, the routing paths may include virtual routing and forwarding (VRF) paths, and the router configuration data may include VRF configuration data.

In accordance with another aspect, there is provided a controller testing or debugging service chain connectivity. The controller may include a data storage device for persistently storing a mapping of a service chain of service appliances to one or more routing paths configured on a physical network. Each routing path may include an access router having an ingress port. The controller may also include a communication interface. The communication interface may also include a transmitter to inject customized echo test packets at the ingress port of each access router of the one or more routing paths. Each customized echo packet may include a test request payload. The communication interface may also include a receiver to receive customized echo reply packets. A customized echo reply packet may include a reply packet payload. The reply packet payload may include a service chain identifier and router configuration data. The service chain identifier may uniquely identify the service chain being tested. The controller may also include a processor configured to aggregate the customized echo reply packets to test connectivity of the service chain using the service chain identifier and the router configuration data from each of the customized echo reply packets.

In some example embodiments, the processor may be further configured to identify a routing path of the one or more routing paths that a reply packet was not received from.

In some example embodiments, the test request payload may be of a predefined data format.

In some example embodiments, the test request payload may include a version number for the predefined data format.

In some example embodiments, the customized echo test packets may include a source identifier referring to an end point of each routing path.

In some example embodiments, the test request payload may include a type of request value which indicates the type of router configuration data to return.

In some example embodiments, the controller may include a processing device (e.g. processor) being operatively coupled to a network. The network may have at least a plurality of programmable network nodes including an ingress node coupled to a data source and an egress node coupled to a data destination. The controller may be operatively coupled to one or more service appliances via the network. The controller may further include a data storage device or memory for persistently storing the mapping of a service chain of service appliances to one or more routing paths configured on the physical network. Each routing path may include an access router having an ingress port. The controller may also include a communication interface operatively coupled to the network. The communication interface may also include a transmitter to inject customized echo test packets at the ingress port of each access router of the one or more routing paths. Each customized echo packet may include a test request payload. The communication interface may also include a receiver to receive customized echo reply packets. A customized echo reply packet may include a reply packet payload, including a service chain identifier and router configuration data. The service chain identifier may uniquely identify the service chain being tested. The memory of the controller may have stored thereon a computer software product executable by the processing device, the computer software product having computer code to aggregate the customized echo reply packets to test connectivity of the service chain using the service chain identifier and the router configuration data from each of the customized echo reply packets.

In some example embodiments, the controller may be a software-defined (SDN) controller and the routing network nodes may be SDN nodes.

In accordance with another aspect, there is provided a router for service chain connectivity. The router may include a communication interface operatively connected to a network. The communication interface may include a receiver to receive a customized echo test packet. The customized echo packet may include a test request payload. The communication interface may include a transmitter to transmit a customized echo reply packet in response to the received customized echo test packet. The customized echo reply timestamp packet may include a service chain identifier and router configuration data. The router may implement a service chain and connect to one or more service appliances. The service chain identifier may uniquely identify the service chain. The router may further include a processor configured to recognize the customized echo request packets using the test request payload and generate the customized echo reply packet.

In some example embodiments, the service chain identifier may include at least three physical attributes of the service chain. For example, three physical attributes may include physical interface, route distinguisher number, and virtual network address.

In some example embodiments, the router may provide a VRF routing path, and the router configuration data may include VRF configuration data.

In accordance with another aspect, there is provided a network communication system for testing service chain connectivity. The network communication system may include a network with at least one controller and at least one router connected to service chain appliances, as described herein.

In accordance with another aspect, there is provided a computer software product associated with a service chain of service appliances connected by a network. The computer software product being storable on a memory of a network controller associated with the network, the computer software product comprising instructions for generating a mapping of a service chain of service appliances to one or more routing paths configured on a physical network. A routing path may include an access router having an ingress port. The computer software product may further include instructions for, at the ingress port of each access router(s) of the one or more routing paths, injecting customized echo test packets. Each routing path may be a logical path which carries all traffic flows from one group of end points to another group of end points. An association between the initial packet and the service chain may be identified by the access interface or port used for packet injection. A routing path may include multiple physical paths between each pair of end points and each physical path comprises an access router with an ingress interface which may be physical port or interface. A customized echo test packet may include a test request payload. The computer software product may further include instructions for receiving customized echo reply timestamp packets. A customized echo reply packet may include a reply payload. The reply payload may include a service chain identifier and router configuration data. The service chain identifier may uniquely identify the service chain being tested. The computer software product may further include instructions for aggregating the customized echo reply packets to test connectivity of the service chain. The customized echo reply packets may be aggregated using the service chain identifier and the router configuration data from each of the customized echo reply packets.

Many further features and combinations thereof concerning the present improvements will appear to those skilled in the art following a reading of the instant disclosure.

DESCRIPTION OF THE FIGURES

Various aspects and embodiments are shown in the drawings, and described in connection therewith.

DETAILED DESCRIPTION

Embodiments described herein relate to data center communication systems implementing service chains. A data center communication system may include data sources, data destinations, and one or more controllers, interconnected by a packet-switched network. The packet-switched network may include ingress nodes, intermediate nodes, and egress nodes. The nodes may include routers, switches, and service appliances or middle boxes that are connected to form service chains. Network virtualization may decouple the physical network and the logical network. A service chain and the functionality provided by its service appliances may be viewed as a logical abstraction of multiple physical connectivity nodes and links. Data packets flowing through the network may follow one or more routing paths. The sequence or series of routing paths may define a service chain.

Information regarding service network connectivity may be important for various users of the network. Some testing or debugging tools may focus only on debugging physical connectivity. To be able to debug service chain connectivity, knowledge of the mapping between the logical network and the physical connection may be required, which may not be readily available. Accordingly, some debugging tools may involve physical network debugging tools.

In one aspect, embodiments described herein may relate to devices, systems and methods for network connectivity testing, including, for example, testing end-to-end connectivity of a service chain. The network connectivity testing may test the nodes used to implement the service chain.

In another aspect, embodiments described herein may relate to devices, systems and methods for identifying one or more locations of connectivity fault on the service chain in the event connectivity is broken. There may be connectivity issues or faults at one or more nodes used to implement the service chain. A controller may have routing path information for a service chain being tested within its accessible storage such as memory. On having received a series of customized echo reply packets, the controller may compare the customized echo reply packets against each node on the routing path according to the order defined by the timestamp inside the customized echo reply packets. If any expected customized echo reply packets is missing or times out, the controller may narrow down the fault scope and figure out possible location or node.

Figure 1:
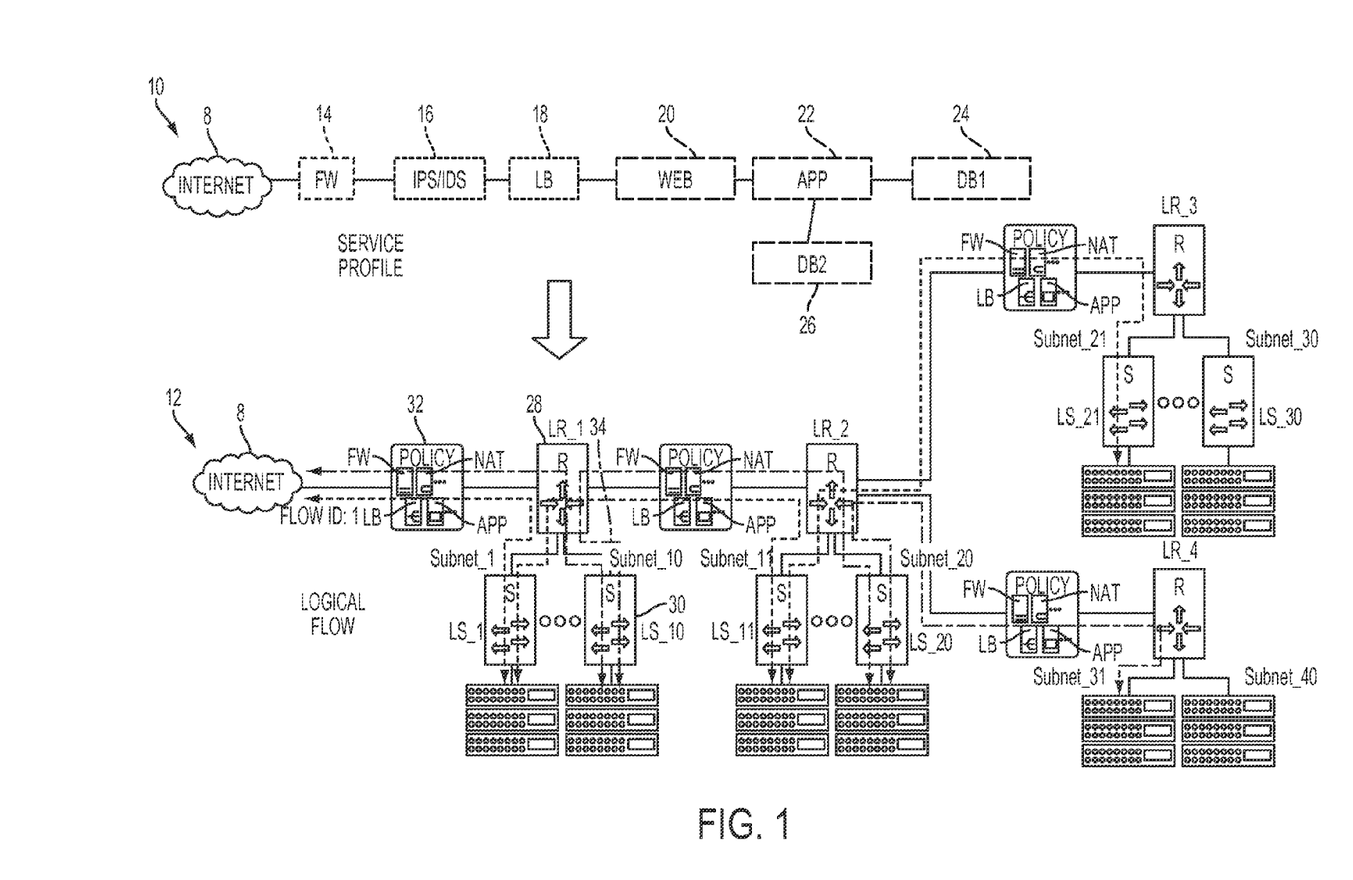
FIG. 1 illustrates a schematic of a logical view of an example service chain implementation.

FIG. 1 illustrates a schematic of an example service chain implementation. A service chain 10, 12 may be represented as a logical flow of data packets through a network of nodes. A service chain 10, 12 may be defined as one or more routing paths to one or more service appliances or middle boxes. Example service appliances include firewalls 14, intrusion detection systems (IDS) 16, intrusion prevention systems (IPS) 16, load balancing (LB) devices 18, web services 20, application services 22, data base services 24, 26, and so on.

A controller may generate a mapping of the service chain 10, 12 to the physical network of nodes. A mapping may provide a virtual abstraction of available services on the network provided by one or more service chains 10, 12, while hiding details of the physical network. The controller may be implemented using one or more processors and a data storage device, as described herein.

FIG. 1 illustrates two different logical level views of a service chain 10, 12. A service chain 10 may be represented as a service profile to provide a logic level user view illustrating functional abstractions of the service chain, such as Internet 8, firewall 14, IPS/IDS 16, LB devices 18, web services 20, application services 22, and databases 24, 26. A service chain 10 may be represented as a logical flow to provide a logic level computer processing view including the Internet 8, switches 30, routers 28, service appliances 32, subnets 34, and other devices used for connectivity.

Figure 2:
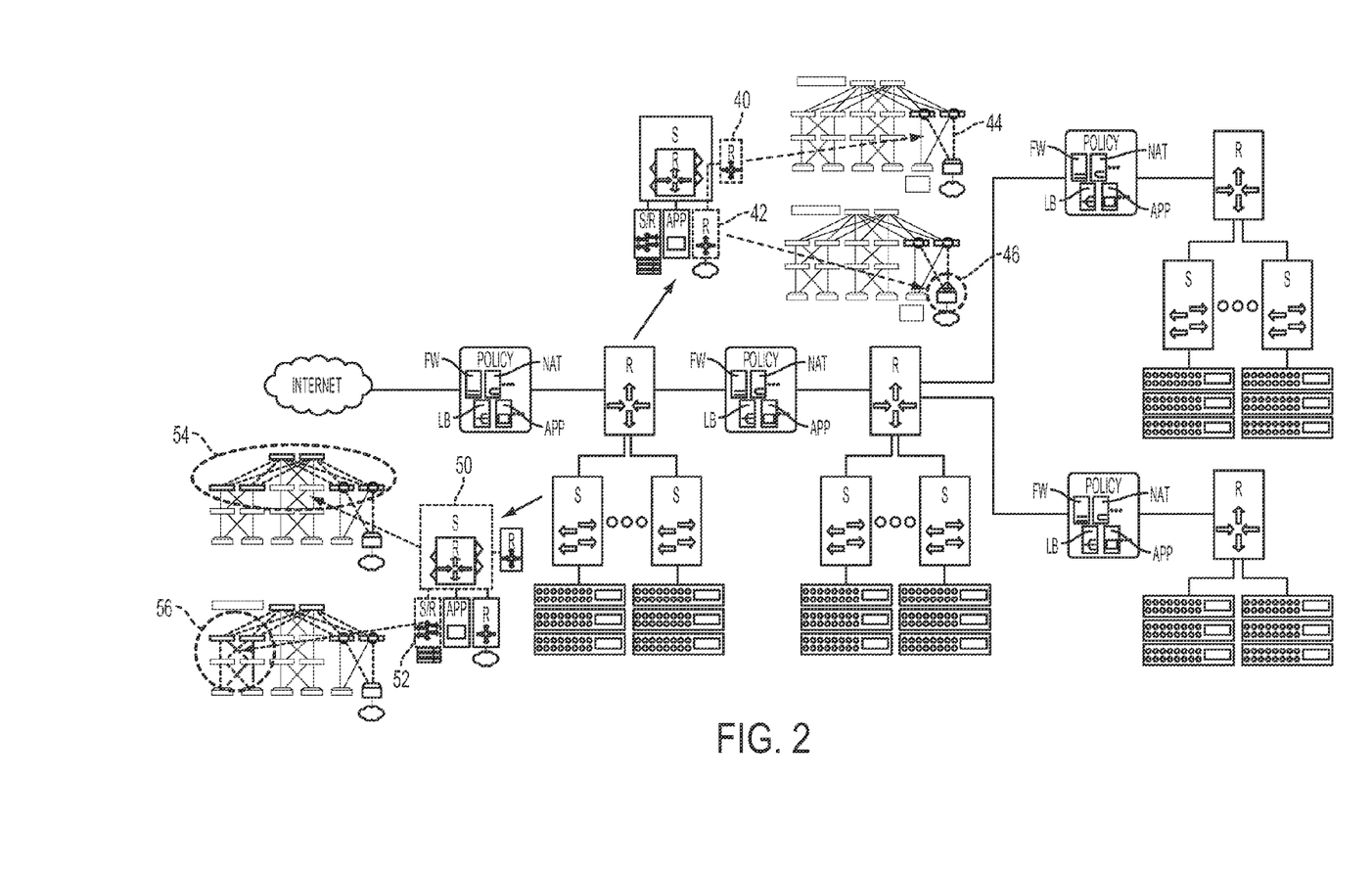
FIG. 2 illustrates a schematic of an example mapping between a logical view of a service chain and the underlying physical network.

FIG. 2 illustrates a schematic of an example mapping between a logical view of a service chain and the underlying physical network. The mapping may link a logical view of routers 40, 42 and the underlying physical network 44, 46. The mapping may link a logical view of switches 50, 52 and the underlying physical network 54, 56. A service chain may be mapped to one or more routing paths on the physical network. Service chain connectivity may be an aggregation of physical links coupling different hardware devices used to implement the service chain. The routing paths may implement virtual forwarding and routing (VRF).

Figure 3:
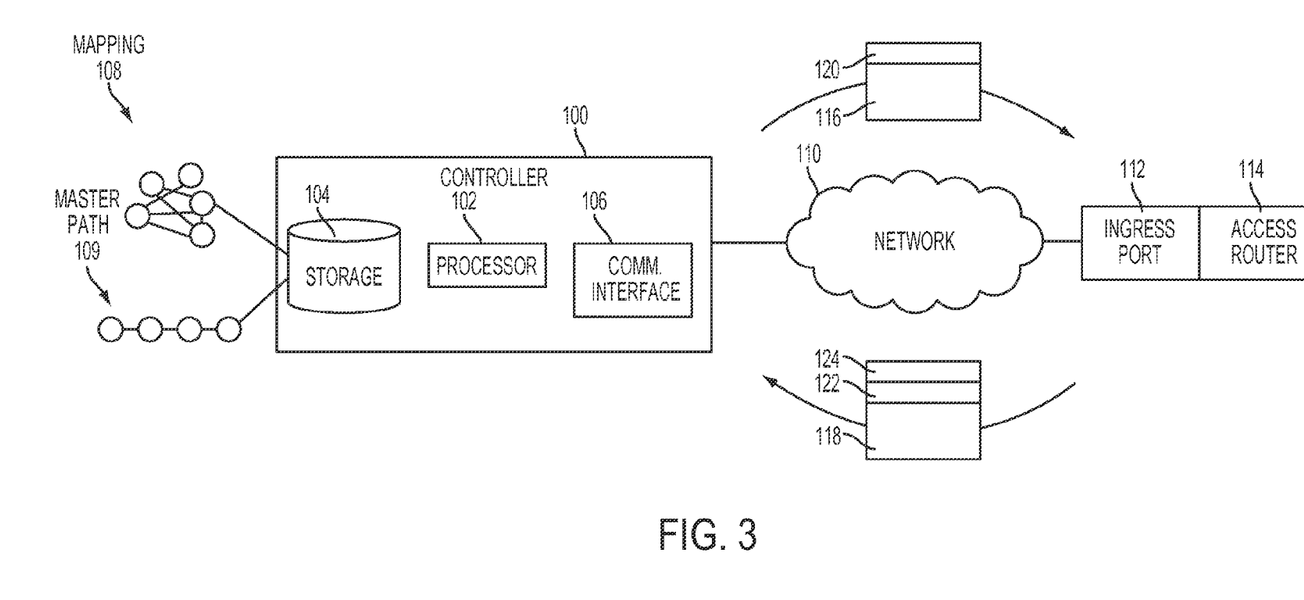
FIG. 3 illustrates a schematic of an apparatus for service chain connectivity according to some embodiments.

FIG. 3 illustrates a schematic of an apparatus for testing or debugging service chain connectivity. The apparatus may include a controller 100 implemented using a processing device. The controller 100 may generate the mapping of a service chain to one or more routing paths configured on a physical network. The mapping may be a virtual representation of the service chain implemented by the physical network. The mapping may define a logical flow of routing tables and routing rule configurations for routing data packets through the routers, switches and service appliances of the physical network. The mapping configuration may also include Link Layer and Network Layer interface configuration data. The mapping configuration may further include VRF configuration data.

The controller 100 may include a data storage device 104. The data storage device 104 may non-transitorily store a network database populated with data relating to the topology and operating characteristics of the network communication system and of the physical network. For instance, the network database may include records identifying each of data sources, nodes and data destinations, records identifying each of the links interconnecting the nodes, records identifying each of the possible routing paths among the network, records identifying each of the possible service chains among the network, and so on. The network database may be updated as the topology and operating characteristics of network change, e.g., as new nodes or links (e.g. service appliances, routers) are added or upgraded, or as nodes or links are removed or fail. Updates regarding changing network conditions may be received from the nodes, or from dedicated monitors (not shown) connected to network. In an embodiment, the network database may be updated in real-time or near real-time.

The data storage device 104 may non-transitorily store a mapping 108 of a service chain to one or more routing paths configured on a physical network. The service chain may include routing paths connecting nodes (e.g. service appliances, routers, switches, and other devices) used to implement the service chain. Each routing path is associated with an access router having an ingress port. The data storage device 104 may store multiple mappings 108 for multiple service chains. The data storage device 104 may include a masterpath 109 for each service chain being tested. The masterpath 109 may define a record of all routing paths used for a specific service chain. Each service chain may have an associated masterpath 109.

The controller 100 may include a communication interface 106 having a transmitter and receiver. The communication interface 106 may be operatively coupled to the physical network of nodes. The transmitter may inject customized echo test packets 116 at the ingress port 112 of each access router 114 of the routing paths. The customized echo test packets 116 may flow through routing paths used to implement the service chain in order to test connectivity thereof. A customized echo test packet 116 may include a test request payload 120. The receiver may receive customized echo reply packets 118 from routers of the routing paths used for the service chain being tested. A customized echo reply packet 118 may include a service chain identifier 122 and router configuration data 124. A customized echo reply packet 118 may also include a timestamp. A timestamp identifies when the reply packet is generated. The timestamp may be used to calculate a packet transportation delay for the performance test as well as the order the request is received at each VRF node on the routing path. The service chain identifier 122 may uniquely identify the service chain being tested.

The controller 100 may include a processor 102 configured to generate the customized echo test packets 116. The processor 102 may also be configured to aggregate the customized echo reply packets 118 using the service chain identifier 122. The processor 102 may aggregate the customized echo reply packets 118 to test connectivity of the service chain using the router configuration data and timestamp data. A missing and expected echo reply packet 118 from a particular routing path may indicate connectivity problems. The controller 100 collects, aggregates and compares the customized echo reply packets 118 to the mapping 108 of the service chain being tested and the masterpath 109 of routing paths for the service chain being tested. That is, the masterpath 109 may be used to define a listing of all expected customized echo reply packets 118 for a service chain being tested. Any missing and expected customized echo reply packets 118 may suggest a connectivity problem and may be used to determine a location of the problem.

For simplicity only one controller 100 is shown but a system may include multiple controllers 100 operable by users to the network services. The controllers 100 may be the same or different types of devices. The controllers 100 may test multiple service chains used by the same data center network or different data centre networks. Accordingly, FIG. 3 is a simplified representation of components in an example apparatus or system.

As shown, the controller 100 may include at least one processor 102, a data storage device 104 (including volatile memory or non-volatile memory or other data storage elements or a combination thereof), and at least one communication interface 106. The computer device components may be connected in various ways including directly coupled, indirectly coupled, and distributed over a wide geographic area and connected via a network.

For example, and without limitation, the controller 100 may be a server, network appliance, set-top box, embedded device, computer expansion module, personal computer, laptop, personal data assistant, mobile device, UMPC tablets, video display terminal, gaming console, and wireless hypermedia device or any other computing device capable of being configured to carry out the methods described herein.

The controller 100 may include any type of processor 102, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Data storage device 104 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Controller 100 may connect to one or more input devices, such as a keyboard, mouse, camera, touch screen and a microphone to configure the controller 100, and may also include one or more output devices such as a display screen and a speaker to display configuration data and other network notifications. For example, controller 100 may generate a graphical representation of a service chain to identify any location of connectivity fault for display on an output device. Controller 100 has a communication interface 106 in order to communicate with other components, to access and connect to the nodes used for implementing service chains by connecting to a network 110 or multiple networks capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. The network 110 includes nodes to implement various service chains as described herein. The network 110 may include a packet-switched network as described herein.

Controller 100 may register and authenticate components or nodes, using security and authentication tokens for example, prior to implementing connectivity tests of service chains involving those components. The controller 100 may serve one data center network 110 or multiple data center networks 110.

Figure 4:
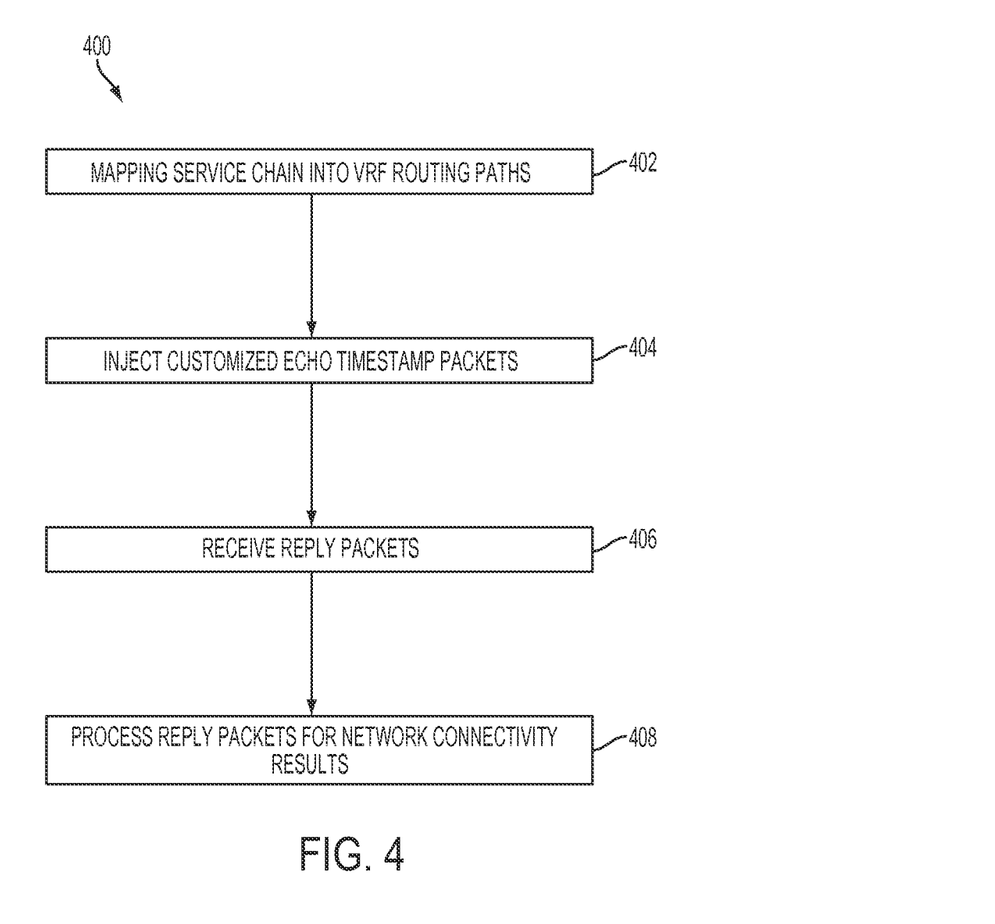
FIG. 4 illustrates a flow chart diagram of a method for service chain connectivity according to some embodiments.

FIG. 4 illustrates a flow chart diagram of a method 400 for service chain connectivity. The network may be controlled by a controller (e.g. controller 100 of FIG. 3) using software-defined networking (SDN) techniques.

At step 402, the controller 100 may translate a service chain into one or more VRF routing paths configured on the physical network. This translation may generate a mapping as described herein. Each VRF routing path may have an access router with an ingress port. The aggregate of all VRF routing paths of the service chain may be referred to as a masterpath for the service chain.

At step 404, the controller 100 may inject customized echo test packets at the ingress port of the access router of each routing path using a transmitter. As an illustrative example, the customized echo test packets may be customized Internet Control Message Protocol (ICMP) packets. ICMP is a protocol of the Internet Protocol Suite. Network devices, like routers, may use ICMP packets to send messages indicating, for example, that a requested service is not available or that a host or router may not be reached. The customized echo test packets may have the same source IP addresses and VLAN identifiers as ingress packets. This may make the test similar to actual data traffic flow.

The customized echo test packets may include a test request payload. The test request payload may include a routing configuration request, such as a VRF routing configuration request. For example, customized echo test packets may contain, as the test request payload, a 64-bit payload with a pre-defined data format. In some example embodiments, the customized echo test packets may have time to live (TTL) values set to 1.

At step 406, the controller 100 may receive, at a receiver, customized echo reply packets from routers used for the VRF routing paths mapped to the service chain(s) being tested. The customized echo reply packets may include timestamps. Each customized echo reply packet may include a service chain identifier and routing configuration data. The service chain identifier may be used to uniquely identify the service chain being tested and that the router is used to implement. The routing configuration data may include VRF configuration data.

A router used for a service chain may be particularly configured to detect a customized echo test packet, recognize the predefined test request payload therein, and transmit an echo reply packet in response with its routing configuration information along with the service chain identifier. As an example, the service chain identifier may include at least three physical attributes of the service chain, such as physical interface, route distinguisher number, and virtual network address.

The router may include a communication interface having a receiver to receive the customized echo test packet, and a transmitter to transmit, in response to the received customized echo test packet, the customized echo reply packet. The router may include a processor configured to recognize the customized echo test packets using the test request payload and generate the customized echo reply packet in response.

As an illustrative example, upon receiving a customized echo test packet whose TTL value is 1, the router may read the first 64 bits of the payload, if the payload exists (e.g. the test request payload in this illustrative example) to check if it has the expected pre-defined data format (e.g. the test request payload). If so, then the router may transmit a customized echo reply packet with a payload containing its VRF configuration information to the controller. This is an example only. The test request payload may be in various locations within the packet.

At step 408, the controller 100 collects the received customized echo reply packets for further processing, transformation and analysis. For example, the controller may aggregate the customized echo reply packets to test end-to-end connectivity of the service chain. A service chain may contain multiple VRF routing paths. A test result may be data based on an aggregation of customized echo reply packet results for all VRF routing paths. The controller may aggregate customized echo reply packets using the service chain identifier. The controller may compare the received customized echo reply packets containing routing configuration data to the masterpath defining all VRF routing paths for the service chain being tested to identify connection faults. In some embodiments, the controller may use the timestamp data to detect connectivity faults and to determine locations of the connectivity faults. The received routing configuration data may be used to identify connectivity error locations on the physical network.

Figure 5:
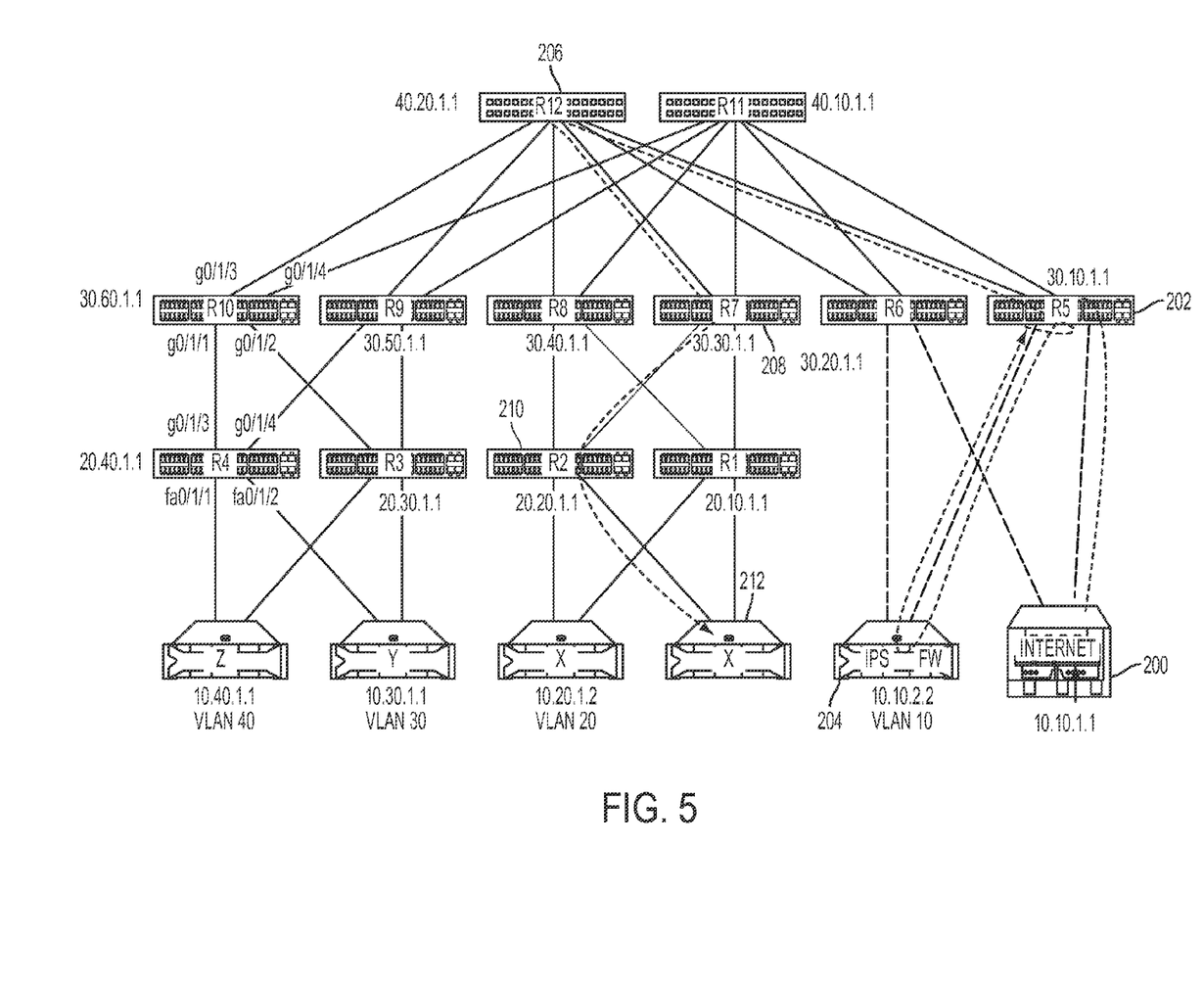
FIG. 5 illustrates a schematic diagram of a mapping of a service chain to a routing path on the physical network according to some embodiments.

FIG. 5 illustrates a schematic diagram of a mapping of service chain onto a VRF routing path on the physical network. A service chain may include the Internet 200, router R5 202, a FW/IPS service appliance 204, router R12 206, router R7 208, router R12 210, and virtual network device X 212. The example shows the following routing path for the service chain: Internet(eth0.10) 200→R5(fa0/1/1, fa0/1/2) 202→FW(eth0.11) 204→IPS(eth0.12) 204→R5(fa0/1/2) 202→R12(g0/1/1, g0/1/3) 206→R7(g0/1/3, g0/1/1) 208 R2(fa0/1/4, fa0/1/2) 210→X(eth0.20) 212. In some embodiments, one service chain may consist of multiple routing paths.

Figure 6:
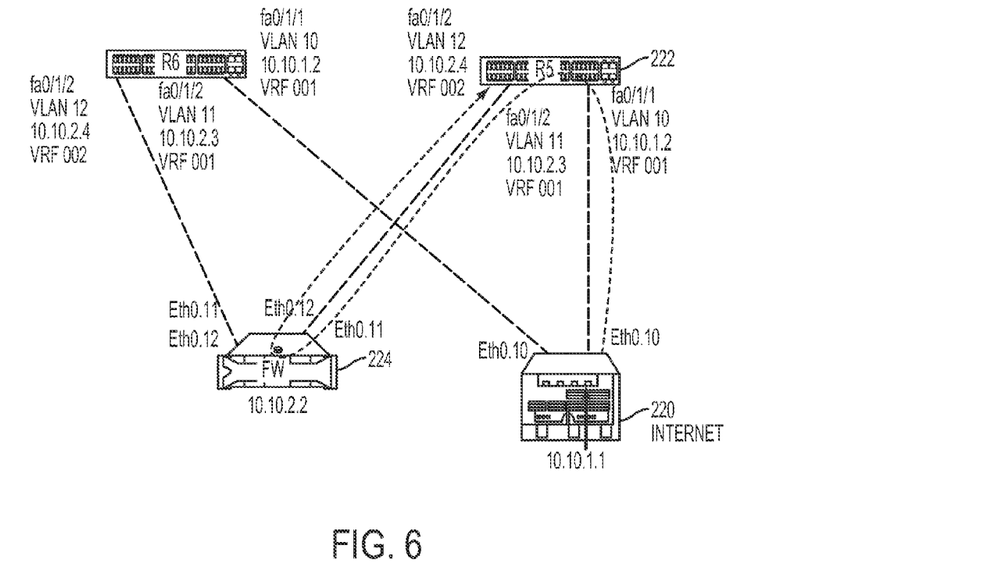
FIG. 6 illustrates a schematic diagram of packet injection according to some example embodiments.

FIG. 6 illustrates a schematic of an example packet injection. The controller may inject a customized echo test packet to the access router on the routing path. In some examples, the source IP of the customized echo test packet may be identical to the end point. The end point may not be the controller entry point. The end may be a computing device, a host, a virtual machine or terminal that attempts or requests to communicate with another host, virtual machine or terminal (e.g. another end point on the other side of routing path or service chain) over the service chain. To differentiate service chains between different logical networks, the service chain may be uniquely identified in the packet using a service chain identifier. For example, the service chain identifier may be identified based on 3 attributes: physical port, VRF route distinguisher (RD) number, and virtual local area network (VLAN) number. For the example in FIG. 6, the entry point fa0/1/1-VRF001-VLAN10 may be a unique identifier for the service chain.

The service chain in this example may include the Internet 220, a router R5 222, and a FW service appliance 224. As an example, the controller may inject the customized echo test packet on router R5 222. The controller may set the customized echo test packet source IP address to an address from the Internet 220. The controller may set the source VLAN to 10 and may then send the packet to the interface fa0/1/1.

Figure 7:
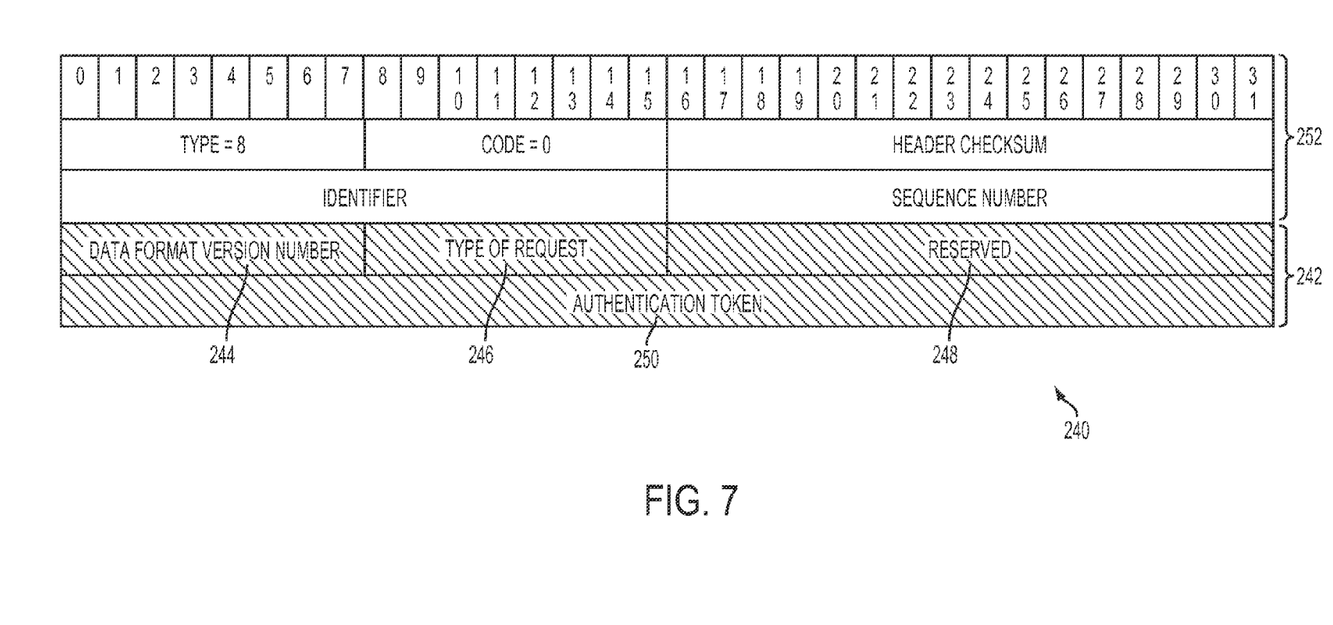
FIG. 7 illustrates a schematic diagram of a customized echo test packet according to some example embodiments.

FIG. 7 illustrates a schematic of an example customized echo test packet 240 according to some embodiments. The customized echo test packet 240 may be persistently defined in a data structure on a data storage device. The packet may include a test request payload 242. In this example, the test request payload 242 may be a 64-bit payload. The test request payload 242 may include a data format version data field value 244. Version data field values may start at 1. The data format version data field value 244 may be used for back-forward compatibility. The test request payload may include a type of request data field value 246 which may instruct the recipient router what information to return. For example, the type of request data field value 246 may be a request for VRF configuration data. The customized echo request packet 240 may also include reserved portion data field value(s) 248 for different types of data, such as a specific attribute for VRF configuration, an extension request, service rules, interface, and so on. In some examples, there may also be a security or authentication token 250 to authenticate the source of the packet and ensure the packet has not been compromised. The controller may generate the customized echo request packet 240. The customized echo request packet 240 may also include other data field values 252, such as for example timestamp, type, code, header checksum, identifier, and sequence number.

Figure 8:
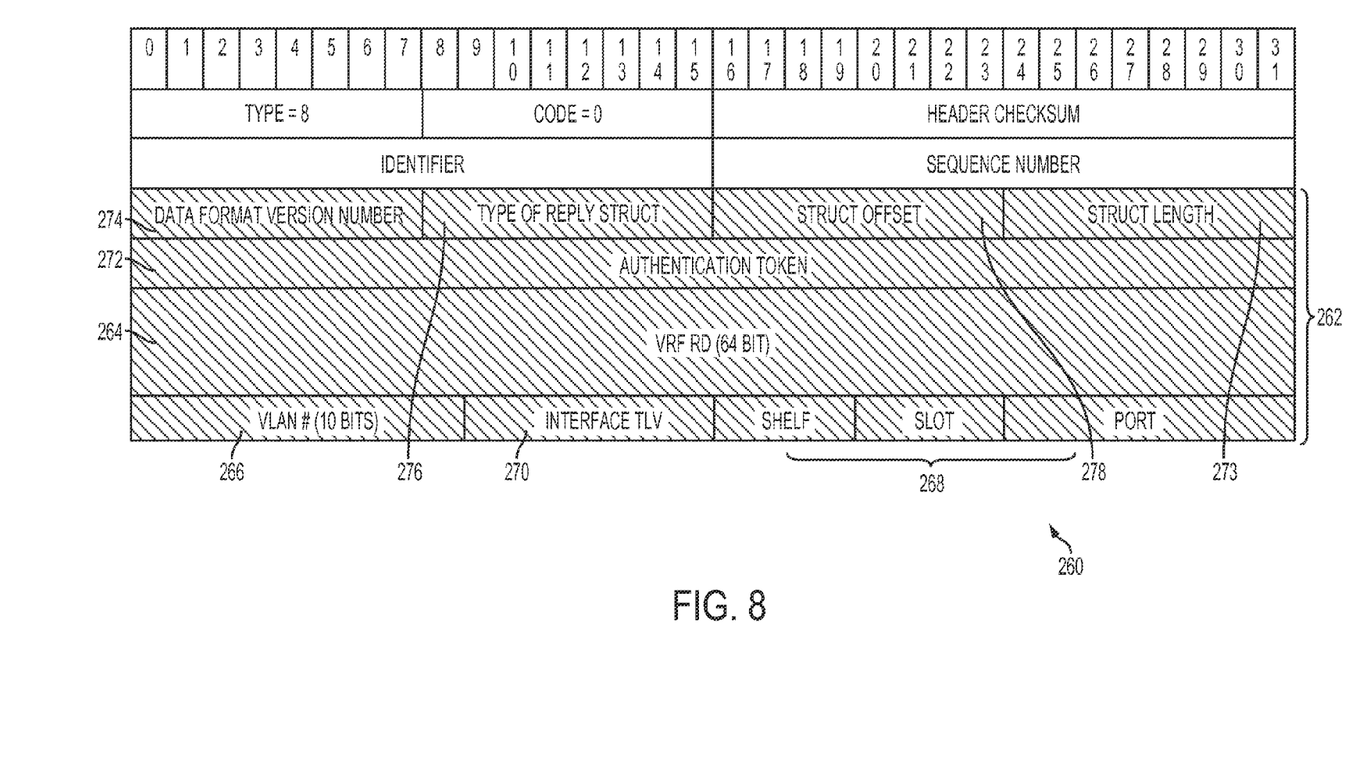
FIG. 8 illustrates a schematic diagram of a customized echo reply packet according to some example embodiments.

FIG. 8 illustrates an example of a customized echo reply packet 260 according to some embodiments. The customized echo reply packet 260 may be generated by the router for transmission to the controller. VRF identification within the reply packet may be mapped back to a service chain by the controller. A customized echo reply packet 260 is transmitted to the controller as opposed to the source or end point of the network. In contrast, a router may transmit a regular ICMP packet to the source or end point. For a regular packet echo the reply may be sent back to end point identified by the source IP. In accordance with embodiments described herein the echo reply may be sent back to controller which generates the packet on behalf of the end point (simulation). The customized echo reply packet 260 may include a reply payload 262. The controller may process the reply payload 262 to determine test results. The reply payload 262 may include a service chain identifier to uniquely identify the service chain being tested. The reply payload 262 may include VRF routing configuration information specific to the router generating the customized echo reply packet 260. This may enable the controller to aggregate all received customized echo reply packets 260 for a specific service chain. A specific combination of attributes may be used as a service chain identifier. This same group of attributes may also define the VRF routing configuration information. For this illustrative example, the following VRF routing configuration information may be returned by the router in the customized echo reply packet 260: VRF route distinguisher (RD) 264, virtual local area network (VLAN) address 266 associated with the VRF routing path, physical interface 268 (e.g. shelf/slot/port) for the VRF routing path. Additional attributes may include an interface type-length value (TLV)

270. This specific combination of attributes may be used as the service chain identifier to uniquely identify the service chain being tested. Other examples may include tunnel identifier such as a virtual extensible local area network ID, a network virtualization using generic routing encapsulation ID, and so on. The customized echo reply packet 260 may also include additional data field values including, for example, an authentication token 272, a data format version data field value 274, a type of reply structure data field value 276, a structure offset data field value 278, timestamp, and structure length data field value 273. The authentication token 272 may provide a check to authenticate that the packet was received from a trusted router, for example.

Figure 9:
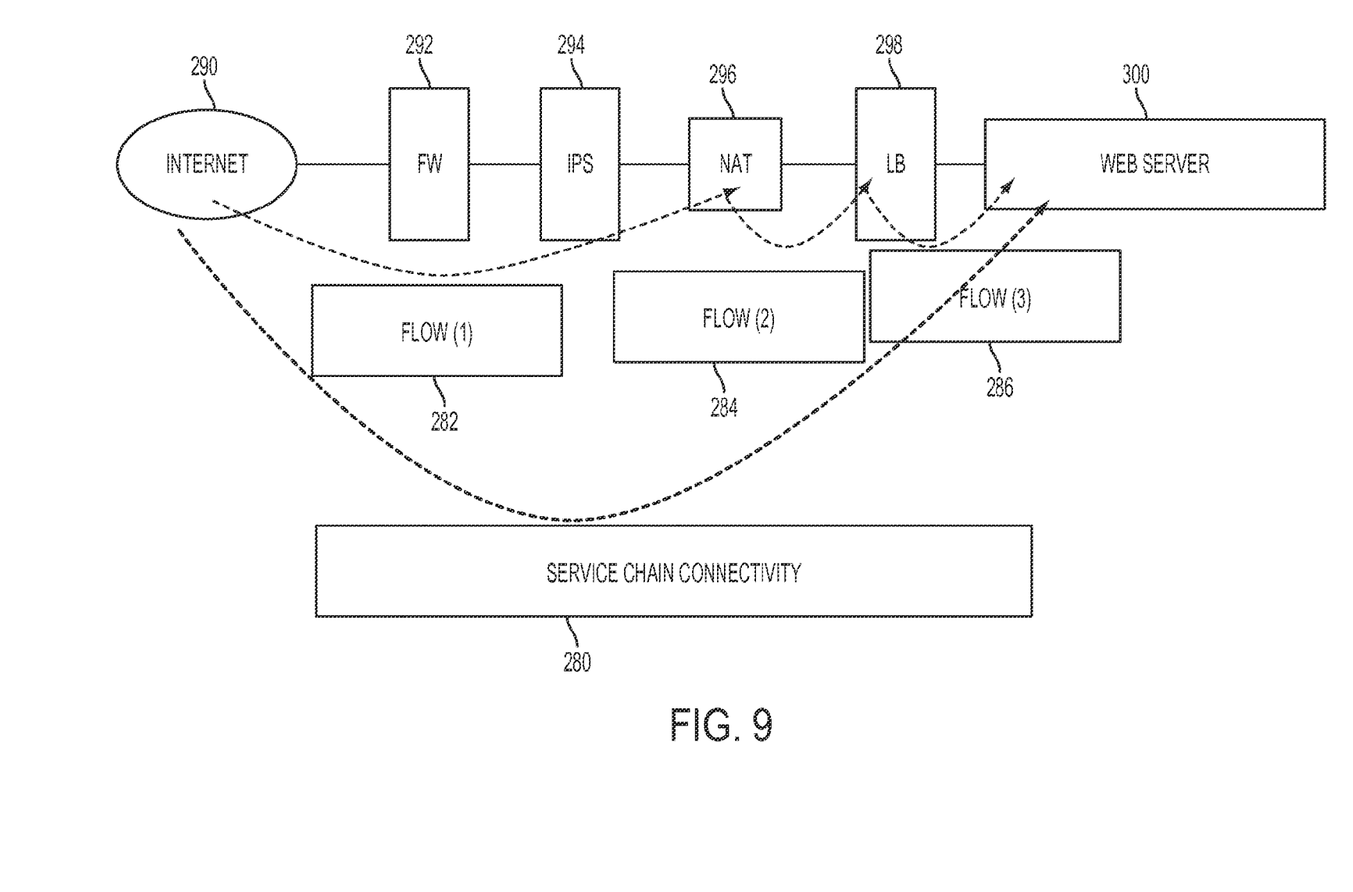
FIG. 9 illustrates a schematic diagram of example virtual routing and forwarding (VRF) paths.

FIG. 9 illustrates a schematic diagram of example VRF routing paths. A service chain may consist of multiple VRF routing paths connecting various devices. The service chain shown, for example, consists of three independent VRF routing paths: (1) VRF routing path 282 connecting Internet 290 to NAT device 296, (2) VRF routing path 284 connecting NAT device 296 to LB device 298, and (3) VRF routing path 286 connecting LB device 298 to Web Server 300. Note that a service chain may connect a particular subset or combination of available service appliances (e.g. NAT device 296, LB device 298, Web Server 300). In some examples, a service chain may not connect all available service appliances (e.g. FW device 292, IPS device 294) on the network.

In order to test connectivity of this service chain, the controller may test each of the three paths independently and aggregate the resulting customized echo reply packets. The controller is configured to aggregate test results (e.g. customized echo reply packets) from multiple VRF routing paths 282, 284, 286 using the service chain identifier in the customized echo reply packets. The controller may access and manage a masterpath 280 for each service chain. A masterpath 280 may identify all VRF routing paths for a respective service chain and define service chain connectivity. The controller collects customized echo reply packets from various routers involved in the service chain. Each customized echo reply packet relates to a segment of the service chain. The controller may compare the received reply packets to the masterpath 280 to identify missing router responses via the VRF configurations. The controller may also use the timestamps to identify connectivity faults. Missing customized echo reply packets may indicate connectivity fault locations.

Figure 10:
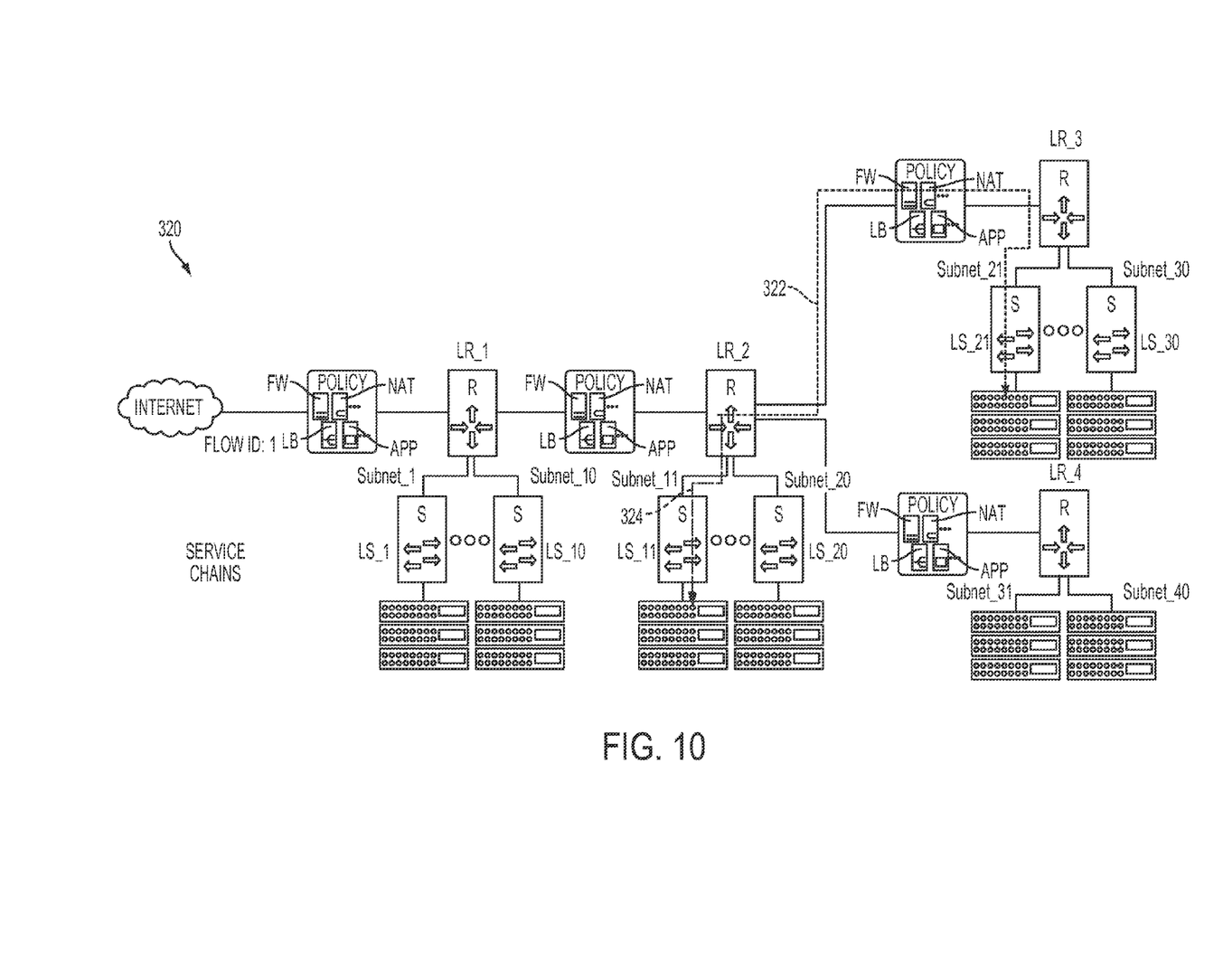
FIG. 10 illustrates a schematic diagram of an example graphical interface display according to some example embodiments.

FIG. 10 illustrates a schematic diagram of an example graphical user interface (GUI) display according to some embodiments. A display device may be configured to display a GUI 320 illustrating a visualization of the connectivity test results. The display device may display the service chain as a highlighted portion, such as the dotted line 322 shown. Otherwise, the display device may display any segments that fail to ping (e.g. no reply packet was received or an error data message was received in reply payload) as another differently highlighted portion, such as the broken line 324 shown. This may help an end user isolate the problem. The controller may provide data for use in generating the GUI display.

In accordance with embodiments described herein, a network repair device may attempt to fix any connectivity fault identified in the test.

Embodiments described herein may provide an effective way to validate correctness of the mapping from service chain to physical topology. The validation may be done based on the completeness of the series of customized echo reply packets received from the VRF routing path and the order these messages are received. Since the controller has the routing path information, it may compare received messages and its order against the routing path. Based on the consistency, the controller may validate if the physical path actually follows the path definition. Embodiments described herein may also provide a way to test connectivity of the service chain and locate connectivity faults. Embodiments described herein may implement service chain abstraction from the physical network. Embodiments described herein may implement service chain abstraction for the physical network with a mapping from service chain to physical network using VRF routing paths. Embodiments described herein may provide an effective connectivity test at a network abstraction level. The test result output may include the VRF configuration information used by the controller to validate the correctness of the service chain setup.

Embodiments described herein may involve user-traffic-packet injection (e.g. customized echo packets) to the ingress interface on the access router of a target service chain.

Embodiments described herein may involve customized echo packets with a special payload including a connectivity test request in a predefined format. Routers used for the service chain may be particularly configured to recognize the test request payload. In response, a router may send a customized echo reply packet carrying VRF configuration information to the requesting controller. The controller aggregates the test results (e.g. received customized echo reply packets) from multiple VRF routing paths to identify connectivity faults. A display device connected to the controller may provide an interface with a visual display of the service chain connectivity.

Accordingly, embodiments described herein may provide a service chain implemented by a physical network of routers and switches abstracted to multiple VRF routing paths. Accordingly, embodiments described herein may provide one or more controllers configured to generate and transmit customized echo test packets and routers configured to recognize the customized echo test packets and respond with reply test packets. Accordingly, embodiments described herein may provide testing tools for the controller to process the customized echo reply packets to complete the connectivity testing. Embodiments described herein may provide a connectivity testing tool for logical network connectivity which may be used as part of a network virtualization platform, such as a data center, for example.

The embodiments of devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code may be applied to input data to perform the functions described herein and to generate output information. The output information may be applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Numerous references may be made regarding servers, services, interfaces, portals, platforms, or other systems formed using computing devices. The use of such terms may represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may provide improved network usage as connectivity faults for service chain implementations may be detected effectively for resolution.

Many example embodiments are discussed. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein may be implemented by using hardware only or by a combination of hardware and software. The technical solution of embodiments may also be in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the computing devices, servers, receivers, transmitters, processors, memory, display, networks for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only. The scope is indicated by the appended claims.

What is claimed is:

1. A method for service chain connectivity comprising:
   mapping, by a controller, a service chain of service appliances to one or more routing paths configured on a physical network, wherein each routing path comprises one or more access routers having an ingress port;
   at the ingress port of each access router of the one or more routing paths, injecting customized echo test packets, each customized echo test packet comprising a test request payload;
   receiving, at the controller, customized echo reply timestamp packets, each customized echo reply packet comprising a reply payload, the reply payload comprising a service chain identifier and router configuration data, wherein the service chain identifier uniquely identifies the service chain using at least a physical interface identifier and a virtual network identifier; and
   aggregating, by the controller, the customized echo reply packets to test connectivity of the service chain using the service chain identifier and the router configuration data from each of the customized echo reply packets.

2. The method of claim 1, further comprising: identifying a routing path of the one or more routing paths that a reply packet was not received from.

3. The method of claim 1, wherein the customized echo test packets comprise a timestamp.

4. The method of claim 1, wherein the test request payload is of a predefined data format.

5. The method of claim 4, wherein the test request payload comprises a version number for the predefined data format.

6. The method of claim 1, wherein the customized echo test packets comprise a source identifier referring to an end point of each routing path.

7. The method of claim 1, wherein the service chain identifier comprises at least three physical attributes of the service chain.

8. The method of claim 7, wherein the at least three physical attributes comprise physical interface, route distinguisher number, and virtual network address.

9. The method of claim 1, wherein the test request payload comprises a type of request value which indicates the type of router configuration data requested in reply.

10. The method of claim 1, wherein the routing paths comprise VRF routing paths, and wherein the router configuration data comprises VRF configuration data.

11. The method of claim 10, wherein the customized echo test packets comprise a source identifier referring to an end point of a VRF routing path of the VRF routing paths.

12. A controller for service chain connectivity comprising:
   a data storage device for non-transitorily storing a mapping of a service chain of service appliances to one or more routing paths configured on a physical network, wherein each routing path comprises one or more access routers having an ingress port, the routing paths comprising VRF routing paths;
a communication interface comprising:
   a transmitter to inject customized echo test packets at the ingress port of each access router of the one or more routing paths, each customized echo packet comprising a test request payload, the customized echo test packets having a source identifier referring to an end point of a VRF routing path of the VRF routing paths;
   a receiver to receive customized echo reply packets, each customized echo reply packet comprising a reply payload, wherein the reply payload comprises a service chain identifier and router configuration data, wherein the service chain identifier uniquely identifies the service chain;
a processor configured to aggregate the customized echo reply packets to test connectivity of the service chain using the service chain identifier and the router configuration data from each of the customized echo reply packets.

13. The controller of claim 12, wherein the processor is further configured to identify a routing path of the one or more routing paths that a reply packet was not received from.

14. The controller of claim 12, wherein the test request payload is of a predefined data format.

15. The controller of claim 14, wherein the test request payload comprises a version number for the predefined data format.

16. The controller of claim 12, wherein the test request payload comprises a type of request value which indicates the type of router configuration data to return.

17. A router for service chain connectivity comprising:
a communication interface comprising:
   a receiver to receive a customized echo test packet, the customized echo packet comprising a test request payload;
   a transmitter to transmit, in response to the received customized echo test packet, a customized echo reply packet, the customized echo reply packet comprising a service chain identifier and router configuration data, wherein the router implements a service chain, wherein the service chain identifier uniquely identifies the service chain using at least a physical interface identifier and a virtual network identifier;
   a processor configured to recognize the customized echo request packets using the test request payload and generate the customized echo reply packet; and
   one or more ports for connecting to one or more service appliances of the service chain.

18. The router of claim 17, wherein the service chain identifier comprises at least three physical attributes of the service chain.

19. The router of claim 18, wherein the at least three physical attributes comprise physical interface, route distinguisher number, and virtual network address.

20. The router of claim 17, wherein the router provides a VRF routing path, and wherein the router configuration data comprises VRF configuration data.

21. The router of claim 20, wherein the customized echo test packets comprise a source identifier referring to an end point of the VRF routing path.

* * * * *